United States Patent Office 2,904,568
Patented Sept. 15, 1959

2,904,568

RECOVERY OF URANIUM FROM AQUEOUS SOLUTIONS

Henry R. Ertelt, Fanwood, Carroll L. Knapp, Jr., Cranford, and John K. Appeldoorn, Westfield, N.J., assignors to Esso Research and Engineering Company, a corporation of Delaware No Drawing. Application December 29, 1955
Serial No. 556,362

12 Claims. (Cl. 260—429.1)

This invention relates to the recovery of uranium from aqueous solutions and relates particularly to the recovery and separation of uranium from aqueous solutions containing other metals such as alkali metals, alkaline earth metals and heavy metals. The method of the present invention is based upon the unique solubilities of short-chain dialkyl dithiophosphates of various metals in several different types of solvents.

The role of uranium in the field of atomic energy is well known. The importance of this particular element has resulted in extensive exploration and mining operations. The recovery and separation of uranium from its ores is an important aspect in the present atomic energy development program. There is a need for a simple, inexpensive and effective method for recovering and separating uranium from its ores as well as from various aqueous solutions or concentrates of uranium.

A novel method has now been found for recovering uranium from aqueous solutions. The present method is particularly useful for the recovery and separation (i.e., purification) of uranium from aqueous solutions which contain other metals such as alkali metals, alkaline earth metals and heavy metals. More particularly, it has been found that short-chain dialkyl dithiophosphates of uranium are freely soluble in water-immiscible, polar solvents, e.g., ethers. Thus, in accordance with the present invention, water-soluble, short-chain dialkyl dithiophosphate is added to an aqueous solution containing uranium ions whereby the uranium is converted to uranium dialkyl dithiophosphate and then this uranium salt is recovered from the aqueous solution by extraction with a polar solvent, e.g., an ether. If heavy metals such as iron, lead, nickel, silver and the like are present in the original aqueous solution, these metals react with the dialkyl dithiophosphate which is added to the solution in accordance with the present invention to form products or complexes which are water-insoluble and which appear to be chelates. These water-insoluble products may be readily separated prior to the uranium extraction step by filtration or by extraction with a non-polar solvent, e.g., an aliphatic hydrocarbon solvent. The alkali and alkaline earth metal dialkyl dithiophosphates are water soluble and are insoluble in the organic solvents and thus remain in the aqueous solution. The method of the present invention has been found to effect essentially a quantitative recovery and separation of uranium from aqueous solutions.

Generally, uranium ores as received from mines are in a subdivided form of about 4 to 100 mesh. These ores may be initially roasted to thereby eliminate some carbon dioxide and sulfur therefrom. Generally, the ores are then mixed with sodium chloride or equivalent compounds and re-roasted in reverberatory furnaces to convert part of the charge to chlorides, primarily to increase the water solubility of the metals. Generally, after this re-roasting operation, the ore is ground to about 40 to 60 mesh and then the ore is leached or boiled with material such as sulfuric acid, sodium carbonate, barium chloride and/or sodium nitrate. An aqueous solution of the water-soluble salts is formed which is then separated by filtration from the remainder of the ore.

Such steps as described above are conventional in uranium refining and do not represent a part of the present invention. Such aqueous solutions, however, may be employed in the present invention. It will be understood, however, that the present invention is not limited solely to aqueous solutions obtained from uranium ore refining operations, but is generally applicable to the recovery and separation of uranium from aqueous solutions which include various wash solutions and the like which are produced in the process of separating uranium$^{235}$ from naturally-occurring uranium. Metals which may be found in aqueous solutions containing uranium include iron, antimony, manganese, calcium, nickel, copper, silver, lead, barium, vanadium, sodium and potassium. The present invention makes possible an effective recovery and separation of uranium from aqueous solutions containing such metals.

The dialkyl dithiophosphates which may be added to the aqueous solution in the initial step of the present invention are those which are water soluble. These dialkyl dithiophosphates contain in the range of 1 to 6 carbon atoms and preferably contain 2 to 4 carbon atoms in each alkyl group. These dialkyl dithiophosphates may be those of alkaline earth metals (e.g., calcium and barium) but preferably are those of alkali metals such as potassium and sodium. Specific examples of such water-soluble dialkyl dithiophosphates include potassium diisopropyl dithiophosphate, sodium dimethyl dithiophosphate, calcium dihexyl dithiophosphate, barium dibutyl dithiophosphate and potassium methyl propyl dithiophosphate. The addition of the water-soluble dialkyl dithiophosphate forms uranium dialkyl dithiophosphate, which is water soluble. It is preferred that the pH of the aqueous solution to which the water-soluble dialkyl dithiophosphate is added be in the range of about 6 to 9, more preferably about 6.5 to 8. An inorganic acid or base, preferably an alkali metal or alkaline earth metal base, may be added to the aqueous solution to adjust the pH thereof within these pH limits if desired. The amount of water-soluble dialkyl dithiophosphate added to the aqueous solution will depend upon the concentration of metal ions present in the original aqueous solution. More specifically, the amount of water-soluble dialkyl dithiophosphate added should generally be sufficient to combine with all metal ions present. If desired, a stoichiometric excess, e.g., about 5 to 50% or more, may be employed.

If uranium is to be recovered from an aqueous solution containing only uranium ions or from aqueous solutions containing uranium ions and alkali metals and/or alkaline earth metals, the uranium dialkyl dithiophosphate formed as described above by the addition of water-soluble dialkyl dithiophosphate may be recovered by extraction with a water-immiscible, polar solvent, e.g., an ether. For example, dialkyl ethers having the following formula:

$$R'OR''$$

where R' and R'' are alkyl groups, preferably containing about 2 to 10 carbon atoms in each alkyl group and more preferably about 2 to 4 carbon atoms in each alkyl group, may be employed. It will be understood that R' and R'' may represent different alkyl groups. Specific examples of ethers useful in the present invention include diethyl ether, dipropyl ether, dibutyl ether, dihexyl ether, ethyl butyl ether, etc. Other types of polar solvents may also be employed. The uranium dialkyl dithiophosphate may be recovered from the extract by volatilizing the polar solvent by evaporation, distillation or stripping. It will be understood that any alkali or alkaline earth metals present in the original aqueous solution will remain in the aqueous solution since they are not soluble in the polar organic solvent.

If the original aqueous solution contains metals other than uranium, alkali metals and alkaline earth metals, an intermediate separation step is required. For example, aqueous solutions containing uranium ions may also include ions of the following metals: manganese, iron, cobalt, nickel, copper, silver, cadmium, indium, lead, tin, antimony, mercury, chromium and vanadium. The addition of the water-soluble dialkyl dithiophosphate to the aqueous solution in the initial step of the present method converts these metals to water-insoluble complexes. Such water-insoluble complexes may be then separated from the aqueous solution, for example, by filtration or by extraction with a non-polar solvent. When separation by extraction is employed, it is preferred to employ a saturated aliphatic hydrocarbon solvent such as, for example, a $C_5$ to $C_{10}$ saturated aliphatic hydrocarbon. Specific examples of hydrocarbon solvents which may be employed include hexane, heptane, benzene, toluene, octane, decane, etc. It will be understood that these non-polar solvents are water immiscible. It has been found that the dialkyl dithiophosphates of uranium, alkali metals and alkaline earth metals are essentially insoluble in such non-polar solvents. On the other hand, it has been found that the metal complexes mentioned above are freely soluble in such non-polar solvents. After the above-mentioned separation step (carried out either by filtration or extraction) is completed, the uranium dialkyl dithiophosphate may then be recovered and separated from the aqueous solution by extraction with a polar solvent as described heretofore.

Generally, the present method is operable within the range of about 32° to 212° F., although usually temperatures in the range of about 40° to 150°, preferably about 50° to 100° F., will be employed. Generally, the present method will be carried out at atmospheric pressure although it will be understood that higher or lower pressures may be employed if desired. The times required for the various steps are not particularly critical. After the addition of the water-soluble dialkyl dithiophosphate to the aqueous solution in the initial step of the present method, it is preferred to thoroughly mix the aqueous solution for about 0.1 to 1 hour, although the formation of the uranium dialkyl dithiophosphate and other products is practically instantaneous. It will be understood that the extraction steps described heretofore may be carried out in stages if desired; that is, two or more successive extractions with each type of solvent may be employed. Preferably these extraction steps are carried out with agitation to thereby increase the effectiveness of the extraction. Thereafter, the mixture may be allowed to stand for a period of time sufficient to separate the water from the water-immiscible solvent and the two layers may then be separated by decantation or other equivalent separation methods. The present method may be carried out on either a batch or continuous basis.

In the method of the present invention, uranium is recovered in the form of uranium dialkyl dithiophosphate wherein each of the alkyl groups contain in the range of about 1 to 6 carbon atoms. Specific examples of these products of the present invention include uranium diisopropyl dithiophosphate, uranium diethyl dithiophosphate, uranium dimethyl dithiophosphate, uranium dibutyl dithiophosphate, uranium diamyl dithiophosphate, uranium dihexyl dithiophosphate and uranium propyl butyl dithiophosphate. The uranium dialkyl dithiophosphates may be employed per se as useful additives for hydrocarbon products such as lubricating oils wherein they act as inhibitors.

The invention will be more fully understood by reference to the following examples. It is pointed out, however, that the examples are given for the purpose of illustration only and are not to be construed as limiting the scope of the present invention in any way.

*Example I.—Recovery of uranium ions from aqueous solution*

To about 50 cc. of a yellow aqueous solution of uranyl acetate (2 g. per 100 ml.) was added about 10 cc. of a colorless solution of commercial grade potassium diisopropyl dithiophosphate (solution contained about 5 g. of dithiophosphate per 100 ml. of solution). The resultant solution was extracted with about 20 cc. of hexane. No color was imparted to the hexane layer, indicating that none of the uranium diisopropyl dithiophosphate was extracted into the hexane. The aqueous solution was then extracted with diethyl ether and the ether layer became yellow and the aqueous layer colorless. This indicated that the uranium diisopropyl dithiophosphate was extracted into the ether layer (uranium acetate itself is not extracted into ether).

*Example II.—Recovery of uranium ions from aqueous solution containing other metals*

Experiment I was repeated except that about 1 g. of nickel nitrate per 100 ml. was also present in the original aqueous uranium solution. In this case, extraction with hexane removed the nickel diisopropyl dithiophosphate which produced an intense purple color in the hexane layer. The uranium diisopropyl dithiophosphate remained in the aqueous phase. Again the uranium diisopropyl dithiophosphate was extracted from the water solution with diethyl ether, resulting in the ether layer becoming yellow and the aqueous layer colorless.

Uranium can be effectively recovered in a similar manner from aqueous solutions containing, for example, iron, cobalt, manganese, chromium, copper, lead, cadmium, silver, indium, tin, mercury, antimony and vanadium ions. Other experiments have shown that water-insoluble dialkyl dithiophosphate complexes of such metals may be formed by addition of alkali metal dialkyl dithiophosphate to aqueous solutions of such metals, and that the complexes may then be extracted with hexane from the aqueous solutions.

What is claimed is:

1. A method for recovering uranium ions from aqueous solution which comprises adding to said aqueous solution water-soluble dialkyl dithiophosphate containing in the range of 1 to 6 carbon atoms in each alkyl group, and then extracting the resultant uranium dialkyl dithiophosphate from said aqueous solution with a water-immiscible, polar solvent.

2. Method according to claim 1 wherein said polar solvent comprises an ether.

3. Method according to claim 2 wherein said ether has the formula $$R'OR''$$

where R' and R'' are alkyl groups containing 2 to 10 carbon atoms.

4. Method according to claim 1 wherein said water-soluble dithiophosphate is an alkali metal dialkyl dithiophosphate.

5. A method for concentrating uranium ions from aqueous solution containing ions of other metals such as alkali metals, alkaline earth metals and heavy metals which comprises adding to said aqueous solution an alkali metal dialkyl dithiophosphate containing in the range of 1 to 6 carbon atoms in each alkyl group, separating any resultant water-insoluble material from said aqueous solution, and then extracting uranium dialkyl dithiophosphate from said aqueous solution with a water immiscible, polar solvent.

6. Method according to claim 5 wherein said separation of resultant water-insoluble material is carried out by filtration.

7. Method according to claim 5 wherein said separation of resultant water-insoluble material is carried out by extraction thereof with a water-immiscible, non-polar solvent.

8. Method according to claim 7 wherein said non-polar solvent is an aliphatic hydrocarbon.

9. Method according to claim 5 wherein said polar solvent is a dialkyl ether.

10. Method according to claim 5 wherein said uranium dialkyl dithiophosphate is recovered from the extract by volatilizing said polar solvent.

11. Method according to claim 5 wherein the pH of said aqueous solution is in the range of about 6 to 9.

12. A method for concentrating uranium ions from aqueous solution containing ions of other metals such as alkali metals, alkaline earth metals and heavy metals, which comprises adding to said aqueous solution potassium diisopropyl dithiophosphate, separating from said aqueous solution any resultant water-insoluble material by extraction with hexane, and then extracting uranium dialkyl dithiophosphate from said aqueous solution with diethyl ether.

References Cited in the file of this patent

Chretien et al.: "Uranyl Orthophosphates," Bull. Soc. Chim., France (5) 5, 372–85 (1938).